United States Patent [19]
Lorey

[11] Patent Number: 5,976,227
[45] Date of Patent: Nov. 2, 1999

[54] DEVICE FOR SEPARATING LIQUID FROM A GAS-LIQUID MIXTURE

[75] Inventor: Manfred Lorey, Lagenselbold, Germany

[73] Assignee: Filtan Filter-Anlagenbau GmbH, Langenselbold, Germany

[21] Appl. No.: 08/841,225

[22] Filed: Apr. 29, 1997

[51] Int. Cl.⁶ .................................................. B01D 19/00
[52] U.S. Cl. .............................. 96/209; 55/396; 55/397; 55/459.1
[58] Field of Search .............................. 55/396, 397, 442, 55/452, 453, 459.1, DIG. 37, DIG. 14; 96/209, 210, 195, 215, 212; 95/34, 271

[56] References Cited

U.S. PATENT DOCUMENTS

| 472,310 | 4/1892 | Mosher | 55/452 |
| 1,735,298 | 11/1929 | Pfeffer | 55/396 |
| 1,917,643 | 7/1933 | Goldkamp | 55/396 |
| 2,402,845 | 6/1946 | Rodman | 55/396 |
| 3,576,132 | 4/1971 | Kotoc | 55/396 |
| 3,884,660 | 5/1975 | Perry, Jr. et al. | |

FOREIGN PATENT DOCUMENTS

| 140720 | 5/1949 | Australia | 55/396 |
| 42323 | 7/1887 | Germany | 55/397 |
| 28 50 019 | 11/1978 | Germany | |
| 28 50 020 | 11/1978 | Germany | |
| 133711 | 11/1951 | Sweden | 55/396 |
| 1146262 | 3/1969 | United Kingdom | |

Primary Examiner—C. Scott Bushey
Attorney, Agent, or Firm—Akin, Gump, Strauss, Hauer & Feld, L.L.P.

[57] ABSTRACT

A device for separation of liquid from a gas-liquid mixture has a vortex tube through which a gas-liquid mixture flows at speeds generating centrifugal forces with accelerations >50 g, which cause liquid droplets to precipitate on the interior walls of the vortex tube. The vortex tube has an inlet facility, particularly inlet nozzles, in the inlet area of the tube for introducing the gas-liquid mixture into the vortex tube and setting the gas-liquid mixture into a rotary motion within the tube. Circular evacuation ports are arranged one behind the other in a direction of flow of the gas-liquid mixture for discharge of the precipitated liquid. The ports each have a constant width s over their length l, wherein the length l of each evacuation port is constructed as to maintain a laminar flow of the precipitated liquid. Each evacuation port forms a maximum angle α of 10° with the longitudinal axis of the vortex tube.

20 Claims, 3 Drawing Sheets

DEVICE FOR SEPARATING LIQUID FROM A GAS-LIQUID MIXTURE

BACKGROUND OF THE INVENTION

The invention relates to a device for separating liquid from a gas-liquid mixture with a vortex tube through which the gas-liquid flows for generating centrifugal forces with acceleration >50 g, the vortex tube having evacuation ports for discharge of the liquid to be separated, and a supply facility, particularly inlet nozzles, located in the inlet area of the vortex tube, with which the gas-liquid mixture is introduced into the vortex tube and set in rotary motion in the tube. The vortex tube has a plurality of circular evacuation ports arranged one behind the other in the direction of flow and having a constant width over their length.

For separating liquids from gas-liquid mixtures, as for example natural gas, which mostly still contains certain portions of water, special separation devices are used which have a vortex tube. Such a vortex tube separator is described in German published patent applications DE-OS 2850020 and DE-OS 2850019 and consists of a double casing tube, inlet nozzles and regulating cone. The gas or gas mixture is introduced tangentially into the casing area through the inlet nozzles. In most cases, the gas already attains here the speed of sound, which depends upon the relationship between inlet and exit pressure. By precise layout and exact construction of the vortex tube, a vortex can be generated therein, in which centrifugal forces occur which are up to several million times greater than the acceleration due to gravity g (e.g., 50 to 5 million g). The maximum forces generated in a multiple cyclone separator with about fifty times the acceleration due to gravity are comparatively small.

On account of the Hilsch effect, a warm and a cold gas current are generated in the vortex tube. A regulating cone is situated at the end of the vortex tube, which permits separating the warm from the cold gas. These two gas currents can have temperature differences of up to 80° K. To be sure, this is determined by the pressure ratio, the quantitative relationship between warm and cold gas, as well as by the gas composition.

During the almost isentropic expansion of the gas through the inlet nozzles, a condensation of components dissolved in the gas takes place. These are flung against the tube wall by the centrifugal forces occurring on account of the vortex. At the same time, the gas moves from the tube wall in the direction of the tube interior and thereby cools. By separating the liquid phase from the vortex tube, one obtains two circumscribed gas and liquid phases.

An interesting phenomenon of the vortex tube separator is that it can bring about a separation of heavy components from a gas stream despite a phase imbalance. This can be explained by the influence of the specific weight at high gravitational forces. After entering through the inlet nozzle, the liquid drops move together with the gas in a centrifugal field. This throws the liquid drops onto the tube wall. The liquid phase is separated before it can be heated up in the warm gas zone, or is separated in the cold gas stream. In this way, it is possible to obtain a separation of the condensate from the gas stream, although both phases are in imbalance. For drawing the liquid component off, one drainage opening is provided on each of the front and back ends of the vortex tube, through which the liquid-gas stream is pressed out on account of the high pressure. One of the drainage openings can be situated in the area of an immersion tube inserted into the interior of the vortex tube. In a separator connected to the drainage openings, the definitive separation of the liquid component from the gas part then takes place.

The path of the liquid drops depends upon their size. Larger liquid drops fly to the vortex tube wall in a short time and there likewise move axially in a spiral-shaped path. Depending upon the gas-liquid ratio and the physical properties of the liquid, the liquid current on the interior wall of the vortex tube is also changed. If, for example, little water is contained in an air-water mixture, the water does not form a film, and the drops basically move separately from one another. This is, for example, different with certain proportions of hydrocarbons and water, as for example with fuels, which form a fine film on the interior of the vortex tube wall.

The surface of the liquid film is not smooth on account of the adjacent gas current, so that due to the overlying wave structure, liquid drops can under certain conditions break away from this surface and get back into the gas-liquid mixture. It is necessary, therefore, among other things, also not to let the thickness of the liquid film being formed rise to such values that the surface of the liquid film becomes unstable and consequently leads to the separation of liquid drops.

From U.S. Pat. No. 3,884,660, a device is known in wherein the vortex tube consists of several tube segments between which ring-shaped evacuation ports are arranged. The gas-liquid mixture to be freed of the liquid is introduced through a supply facility into the inlet area of the vortex tube, which has guide vanes arranged at a predetermined angle, so that the gas-liquid mixture within the vortex tube executes a screw-shaped motion. On account of the centrifugal forces which arise (which, however, in contrast to the previously described vortex separators are much smaller) the liquid contained in the gas-liquid mixture precipitates on the interior wall of the tube segment and is guided out through the evacuation ports. The tube sections, which are fitted into one another and between which the evacuation ports are formed, can either have the same interior diameter, or each succeeding tube segment has a smaller interior diameter than the preceding tube segment. In both cases, the inserted end of the respective tube segment has a type of stripping edge in order to be able to undertake a separation of the liquid film from the gas-liquid mixture. Owing to the low centrifugal forces, the differential pressures between the inside and outside of the vortex tube are small (0.05–0.08 bar), so that the width of the evacuation ports which diminish toward the exterior, have to be selected very large. It has been shown that with wide evacuation ports, relatively high gas losses occur, and that narrowing the evacuation ports leads to a backup and to a negative influence on the laminar flow of the liquid film, so that only a part of the liquid film which has precipitated on the interior of the tube segment can actually be separated. The consequence of this is that the separated liquid drops enrich the gas-liquid mixture again. Since the evacuation ports form angles of >20° with the longitudinal axis of the vortex tube, a relatively abrupt deflection of the liquid film takes place, which likewise exerts a disadvantageous influence on the surface of the liquid film. It turns out that liquid drops separate from the surface upon abrupt deflections and return to the gas-liquid mixture.

The same also holds for the vortex tube known from UK Patent 1,146,262, whose evacuation ports to be sure have a constant width, whose axis however, likewise forms a large angle with the evacuation ports. In addition to this, the evacuation ports are short and empty into circular chambers for collecting the separated liquid.

BRIEF SUMMARY OF THE INVENTION

An object of the invention is therefore a device which, proceeding from this known state of the art, makes possible a more effective separation of liquid from a gas-liquid mixture. This object is accomplished with a device of the type described at the outset, wherein the length of the circular evacuation ports in the vortex tube is so constructed to maintain a laminar flow of the liquid to be precipitated, and wherein the evacuation ports form an angle of no greater than 10° with the longitudinal axis of the vortex tube. Advantageous configurations are described in more detail below.

It has surprisingly turned out that the laminar flow of the liquid film deposited on the inside then is not negatively influenced in such a way that liquid drops separate from the surface of the liquid film if the liquid film remains unaffected on its way out of the interior of the vortex tube for such time until feedback effects on the liquid film still situated in the interior of the vortex tube are ruled out.

It is therefore proposed in accordance with the invention that the length l of the evacuation ports be constructed for maintaining a laminar flow of the liquid to be precipitated, and that the evacuation ports have a constant width s over their length l. The flow and the thickness of the liquid film to be separated thereby remain unaffected. For this, it has been found that the evacuation ports may form an angle of a maximum of 10° with the longitudinal axis of the vortex tube. On account of the high axial speed components of the liquid film in the interior of the vortex tube, a breakaway of liquid drops can occur with deflections in an evacuation port which is inclined more than 10° degrees. Due to the soft peeling or stripping off of the liquid film achieved by the invention, no separations of liquid drops occur, and noise development in the vortex tube is minimized.

With respect to the dimensioning of the evacuation ports, care must be taken that the width of the evacuation ports is not basically larger than the thickness of the liquid film, whereby it has turned out that the width of the evacuation ports has an optimal value. When the width is smaller than the thickness of the liquid film, not all of the precipitated liquid is separated. This means that up to a certain width, the degree of separation increases with the width of the evacuation port. If, however, the width of the slot is further enlarged, a strong turbulence appears which tears the liquid film apart. Moreover, not only liquid, but also gas is drawn off from the interior of the vortex tube, which subsequently must be reintroduced into the gas stream at another location order to avoid gas losses. So that no influence is exerted upon the laminar flow of the liquid film, the width of the evacuation port should lie preferably between $1/300$ and $1/10$ of the diameter D of the vortex tube.

With reference to the length of the evacuation port, care must be taken that the turbulence occurring upon leaving the evacuation ports does not exert any feedback action on the liquid film which is still situated in the interior of the vortex tube. Preferably the length l of the evacuation port is proportional to the interior diameter D of the vortex tube wall situated before the evacuation port. In accordance with a preferred embodiment, the length l is $\geq 1/5$ of the diameter D. The upper limit for the length l of the evacuation port lies preferably at twice the diameter D of the vortex tube.

If the interior diameters of all tube segments are of equal size, it is advantageous if a transition region is provided before each evacuation port in which the interior diameter of the vortex tube continually widens up to the beginning of the evacuation port. In order not to give rise to any turbulence in the liquid layer which has formed, the interior surface of the transition region should form a maximum angle α of $\leq 2°$ with the longitudinal axis of the vortex tube.

The length of the transition region should be selected of such magnitude that turbulence possibly occurring at the beginning of the transition region on the way to the outlet vent is already attenuated again. The length of the transition area preferably corresponds to at least three times the length of the adjoining evacuation port. The embodiment which includes the transition region before the evacuation vent is especially suited for gas-liquid mixtures with a liquid-gas weight ratio of 1:1 to 30:1. For gas-liquid mixtures with a liquid-gas weight ratio of <1:1, it is advantageous to dispense with the transition region and instead diminish the internal diameter of the successive tube segments in each case.

The vortex tube preferably comprises at least two tubes fitting into each other, between which the evacuation port is formed. The inserted tube end is preferably phased on the exterior and the receiving tube end is phased on the interior, whereby both phase angles are equal. The phased end of the inserted tube preferably forms a circular cutting edge. The width of the ring slot for evacuation of the liquid to be separated can be adjusted according to how far the two tubes are fitted into each other. Due to the fact that both phase angles are of equal size, it is guaranteed that the width of the evacuation port is constant over the entire length. The evacuation ports are consequently formed solely by appropriate processing of the tube ends. Additional components, as are necessary, for example, in U.S. Pat. No. 3,884,660, are not needed.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
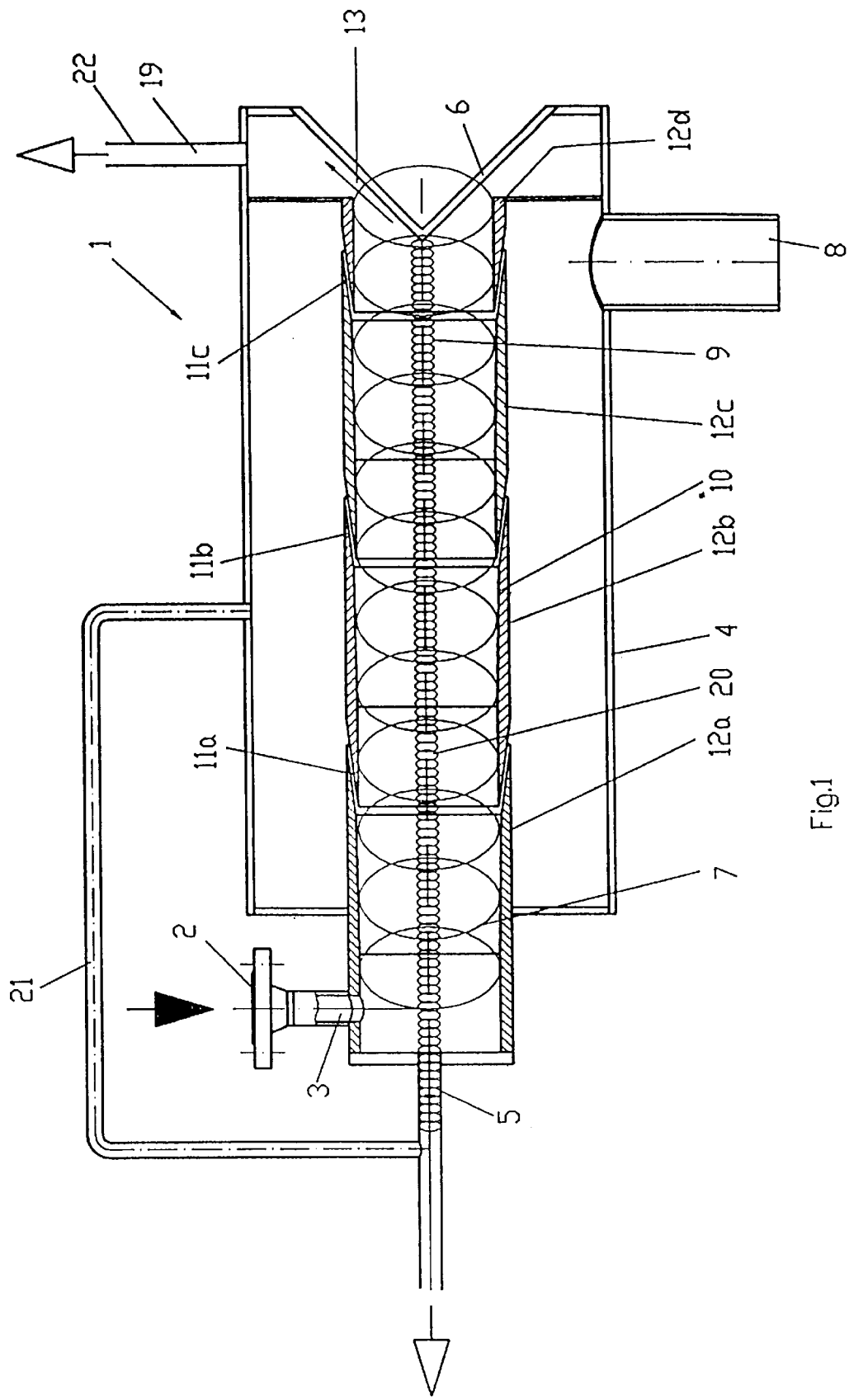
FIG. 1 is a schematic representation of a vortex tube segment in longitudinal section.

A vortex tube separator 1 is represented in FIG. 1 which has a vortex tube 10 with evacuation ports 11a, b, c in a housing 4. The gas-liquid mixture is introduced into the vortex tube 10 through an inlet tube 2, wherein the gas-liquid mixture is accelerated through the inlet nozzle 3. This inlet nozzle 3 is arranged tangentially to the wall of the vortex tube 10, so that the gas-liquid mixture moves in a spiral-shaped path within the vortex tube. The flow of the gas-liquid mixture in the vortex tube 10 is designated by the reference symbol 7. On account of this spiral motion, and owing to the centrifugal forces which occur thereby, the liquid is thrown against the wall where it precipitates as a thin liquid film which is not shown, however, in FIG. 1. Since the liquid film has a motion component in the direction of the longitudinal axis 9 of the vortex tube, the liquid film first of all arrives in the area of the first evacuation port 11a and is peeled off there.

The liquid film likewise precipitates on the remaining tube sections 12b–d and is conducted outside through the corresponding evacuation ports 11b, c and collected in the sump 8. The gas portion, which was separated from the liquid, is conducted through the recirculation circuit 21 back to the cold gas stream. At the end of the vortex tube 10 a cone 6 is situated which forms a gap 13 with the vortex tube 10. The cone 6 has the object of diverting a partial stream as so-called cold gas 20 against the direction of flow and conducting it back in the center of the vortex tube, while the remaining partial stream leaves the vortex tube 10 at the end as hot gas 19 through the tube 22. The dried gas is then drawn off through the dip tube 5. A detailed description of the vortex tube with evacuation ports 11a, b, c is found in connection with FIGS. 2 and 3.

Figure 2:
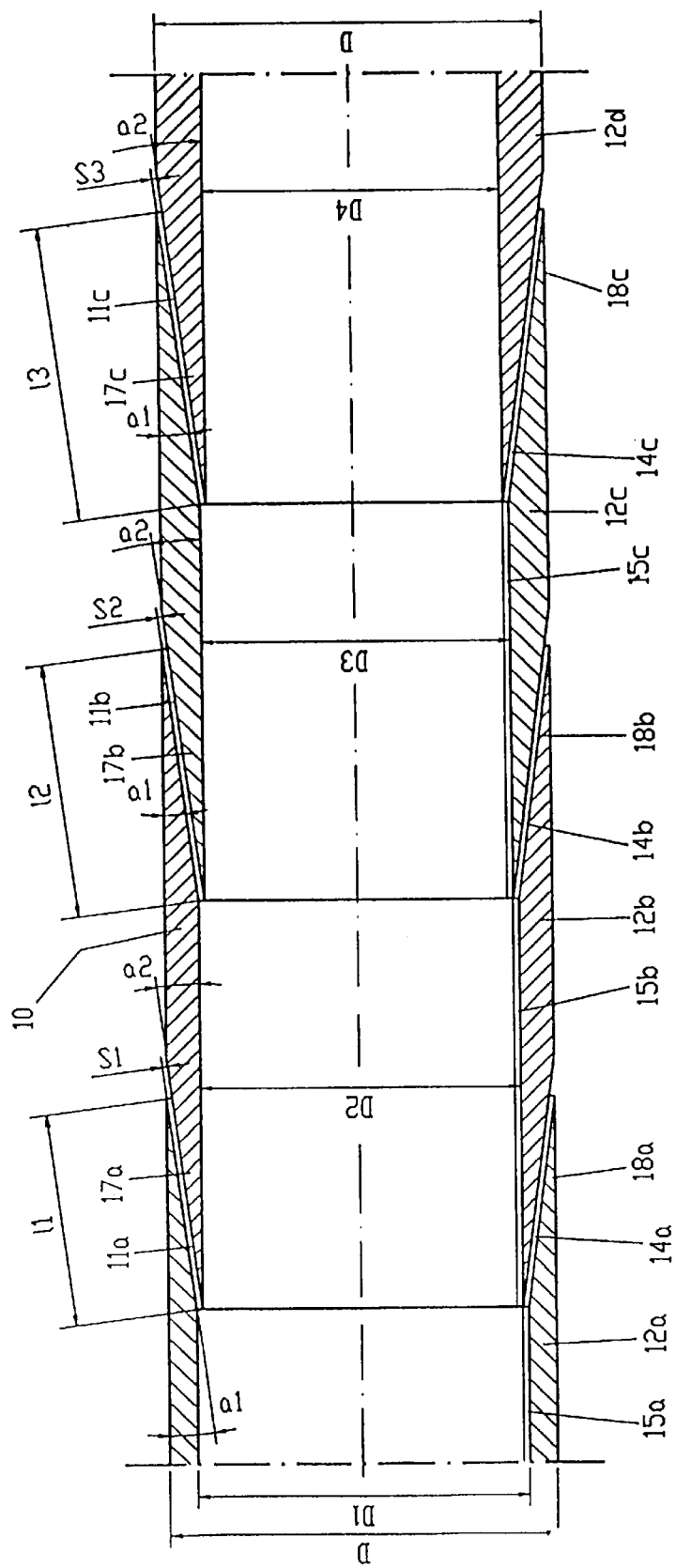
FIG. 2 is an enlarged representation of the longitudinal section depicted in FIG. 1.

In FIG. 2, the vortex tube 10 depicted in FIG. 1 is shown in enlarged representation in longitudinal section. The tube segments 12a, b, c, d have various diameters which are designated with $D_1$, $D_2$, $D_3$ and $D_4$. These diameters diminish in the direction of flow, i.e., from left to right in FIG. 2. This arrangement is suited for gas-liquid mixtures, whose liquid-gas proportion lies under 1%.

Each tube segment 12a, b, c has an end 18a, b, c, which is phased on the interior, and tube segments 12 b, c, d have another end 17a, b, c which is phased on the exterior. In this connection, the phase angles $\alpha_1$ and $\alpha_2$ are identical, so that the tube segments 12a, b, c, and d can be fitted into one another. The phase angles $\alpha_1 = \alpha_2$ shown in here come to 7.5°. Between the phased sections of the tube ends 17a, b, c, 18a, b, c, the respective circular evacuation ports 11a, b, c are formed, whereby the width $s_{1,2,3}$ of the evacuation ports is defined by the offset of the tube segments. Due to the phasing in of tube segments 12a, b, c, d, circular cutting edges 14a, b, c arise on the respective inserted ends 17a, b, c of the tube segments 12a, b, c, which peel off the liquid films 15a, b, c (represented only on the bottom wall) from the gas-liquid mixture. The thickness of the liquid film 15a–c diminishes owing to the reduction of the liquid proportion in the gas-liquid mixture in the direction of flow, which, however, cannot be seen in FIG. 2. The width $s_1$–$s_3$ of the evacuation ports 11a–11c correspondingly diminishes. The slot widths are about 1 mm in the representation illustrated here and consequently possess values which lie between 1/300 and 1/20 of the respective preceding diameter $D_1$–$D_3$.

The lengths $l_1$–$l_3$ of the evacuation ports 11a–11c are likewise proportional to the internal diameter $D_{1,2,3}$ of the vortex tube walls situated in front of the evacuation port and amount to about 2/3 of the respective diameter $D_{1,2,3}$. The evacuation ports 11a–11c extend exclusively between the walls of the tube segments 12a–12d, so that additional components are not necessary for constructing the evacuation ports. Should longer evacuation ports be necessary, falling back on correspondingly thicker tube segments 12a, b, c is recommended.

Figure 3:
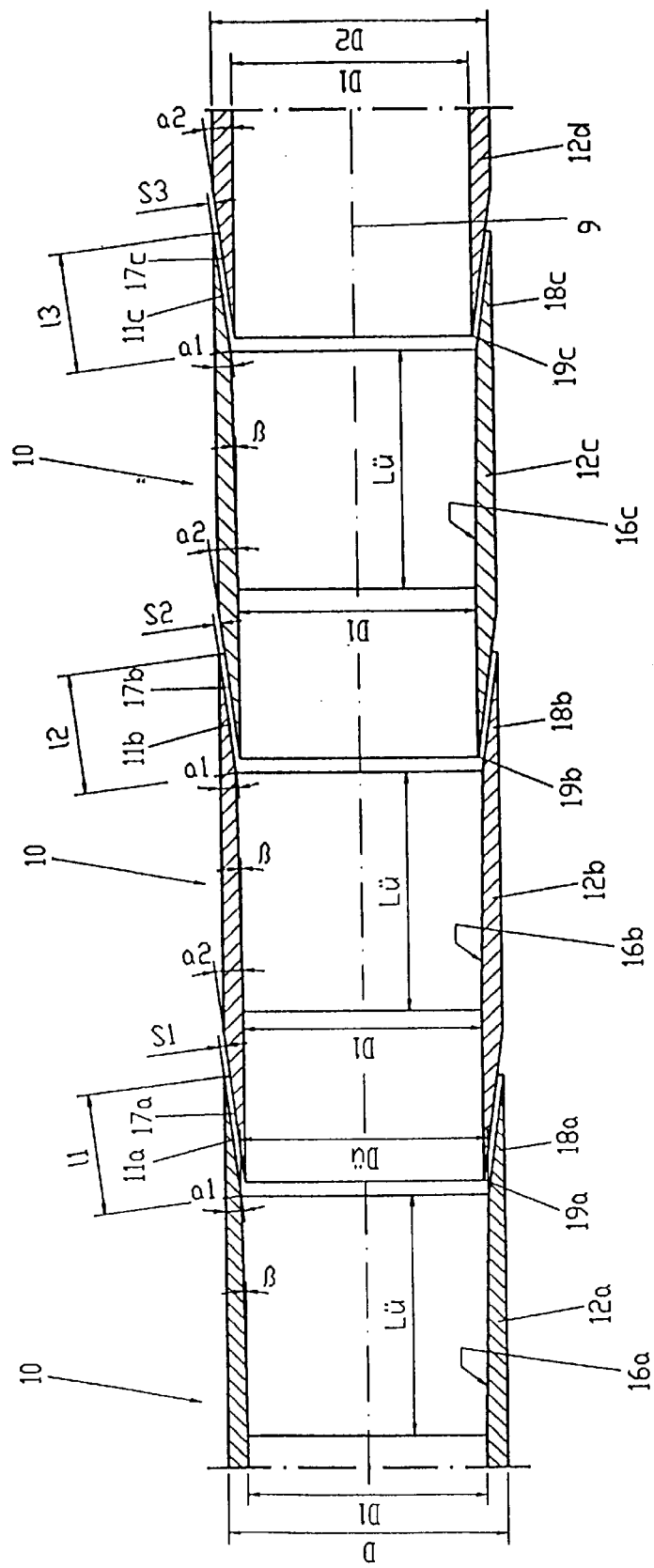
FIG. 3 is an enlarged representation of a vortex tube in accordance with a further embodiment.

If the liquid-gas weight ratio lies between 1:1 and 30:1, it is recommended to use the embodiment of the vortex tube 10 illustrated in FIG. 3. The tube segments 12a–12d all have the same internal diameter $D_1$, and the length $l_{1,2,3}$ of the evacuation ports 11a–11c is likewise equal. The configuration of the evacuation ports corresponds to those which are depicted in FIG. 2. The difference from the arrangement of FIG. 2 consists in that before the respective evacuation ports 11a–11c a respective transition area 16a–c is provided which has the length $L_ü$. The interior surface of the transition areas 16a, b, c forms an angle β with the longitudinal axis 9 of the vortex tube 10, which amount to 1° in the embodiment depicted here. Within this transition area 16a–c, the internal diameter of value $D_1$ continuously increases to the value D ü. The length $L_ü$ of the transition area 16a–c amounts to about three times the length $l_{1-3}$ of the evacuation ports 11a–11c in the embodiment depicted here.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for separation of liquid from a gas-liquid mixture, comprising a housing having a vortex tube therein through which a gas-liquid mixture flows for generating centrifugal forces with accelerations >50 g, the vortex tube having a plurality of evacuation ports for discharge of liquid to be precipitated from the gas-liquid mixture and a tangential inlet nozzle situated in an inlet area of the vortex tube for introducing the gas-liquid mixture into the vortex tube and for setting the gas-liquid mixture into a rotary motion in the vortex tube, the evacuation ports being circular and arranged one behind another in a direction of flow of the mixture, the ports each having a constant width s over their length l, wherein the length l of each evacuation port (11a, b, c) is constructed to maintain a laminar flow of the liquid to be precipitated, and wherein each evacuation port (11a, b, c) forms an angle α of ≦10° with a longitudinal axis (9) of the vortex tube (10).

2. The device according to claim 1 wherein the width s of each evacuation port (11a, b, c) lies between 1/300 and 1/20 of a diameter D of the vortex tube (10).

3. The device according to claim 1, wherein the length l of evacuation port (11a, b, c) is proportional to an internal diameter D of a vortex tube segment in front of the respective evacuation port.

4. The device according to claim 3, wherein the length l of the evacuation port (11a, b, c) is ≧1/5 of the diameter D.

5. The device according to claim 4, wherein the length of the evacuation port (11a, b, c) is ≦2 times the diameter D.

6. The device according to claim 1, wherein a transition region (16a, b, c) is provided in front of each evacuation port (11a, b, c), wherein an internal diameter D of the vortex tube (10) continuously widens up to a beginning of the respective evacuation port (11a, b, c).

7. The device according to claim 6 wherein an interior surface of the transition region (16a, b, c) forms an angle β<2° with a longitudinal axis (9) of the vortex tube (10).

8. The device according to claim 6, wherein a length of the transition region (16a, b, c) corresponds to at least 2 times a length of an adjoining evacuation port (11a, b, c).

9. The device according to claim 1, wherein the vortex tube (10) comprises at least two tube segments (12a, b, c, d) with respective evacuation ports (11a, b, c), the evacuation ports being formed by respective ends of the tube segments inserted into each other, wherein an inserted tube end (17a, b, c) is phased on an outside at a phase angle $\alpha_1$ and a receiving tube end (18a, b, c) is phased on an inside at a phase angle $\alpha_2$, and both phase angles $\alpha_1$, $\alpha_2$ are equal.

10. The device according to claim 9, wherein the inserted tube end (17a, b, c) forms circular cutting edge (14a, b, c).

11. A device for separation of liquid from a gas-liquid mixture, comprising a housing having a vortex tube therein through which a gas-liquid mixture flows for generating centrifugal forces with accelerations >50 g, the vortex tube having a plurality of evacuation ports for discharge of liquid to be precipitated from the gas-liquid mixture and a supply facility situated in an inlet area of the vortex tube for introducing the gas-liquid mixture into the vortex tube and for setting the gas-liquid mixture into a rotary motion in the vortex tube, the evacuation ports being circular and arranged one behind another in a direction of flow of the mixture, the ports each having a constant width s over their length l, wherein the length l of each evacuation port (11*a, b, c*) is constructed to maintain a laminar flow of the liquid to be precipitated, wherein each evacuation port (11*a, b, c*) forms an angle $\alpha$ of $\leq 10°$ with a longitudinal axis (9) of the vortex tube (10), and wherein the vortex tube comprises at least two tube segments with one of the circular evacuation ports being formed between each pair of adjacent tube segments, and each tube segment being phased to form a circular cutting edge (14*a, b, c*).

12. The device according to claim 11, wherein the width s of each evacuation port (11*a, b, c*) lies between 1/300 and 1/20 of a diameter D of the vortex tube (10).

13. The device according to claim 11, wherein the length l of evacuation port (11*a, b, c*) is proportional to an internal diameter D of a vortex tube segment in front of the respective evacuation port.

14. The device according to claim 13, wherein the length l of the evacuation port (11*a, b, c*) is $\geq 1/5$ of the diameter D.

15. The device according to claim 14, wherein the length of the evacuation port (11*a, b, c*) is $\leq 2$ times the diameter D.

16. The device according to claim 11, wherein a transition region (16*a, b, c*) is provided in front of each evacuation port (11*a, b, c*), wherein an internal diameter D of the vortex tube (10) continuously widens up to a beginning of the respective evacuation port (11*a, b, c*).

17. The device according to claim 16, wherein an interior surface of the transition region (16*a, b, c*) forms an angle $\beta < 2°$ with a longitudinal axis (9) of the vortex tube (10).

18. The device according to claim 16, wherein a length of the transition region (16*a, b, c*) corresponds to at least 2 times a length of an adjoining evacuation port (11*a, b, c*).

19. The device according to claim 11, wherein an end of one of each pair of tube segments is inserted into an end of another, wherein an inserted tube end (17*a, b, c*) is phased on an outside at a phase angle $\alpha_1$ and a receiving tube end (18*a, b, c*) is phased on an inside at a phase angle $\alpha_2$, and wherein both phase angles $\alpha_1$, $\alpha_2$ are equal.

20. The device according to claim 19, wherein the inserted tube end (17*a, b, c*) forms the circular cutting edge (14*a b, c*).

* * * * *